(12) United States Patent
Aggarwal et al.

(10) Patent No.: US 8,010,541 B2
(45) Date of Patent: Aug. 30, 2011

(54) SYSTEMS AND METHODS FOR CONDENSATION-BASED PRIVACY IN STRINGS

(75) Inventors: Charu C. Aggarwal, Mohegan Lake, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 759 days.

(21) Appl. No.: 11/540,406

(22) Filed: Sep. 30, 2006

(65) Prior Publication Data

US 2008/0082566 A1    Apr. 3, 2008

(51) Int. Cl.
*G06F 17/30* (2006.01)
(52) U.S. Cl. ........................................... 707/756
(58) Field of Classification Search ............... 707/602, 707/756
See application file for complete search history.

(56) References Cited

U.S. PATENT DOCUMENTS

| | | | |
|---|---|---|---|
| 5,855,018 A * | 12/1998 | Chor et al. .................... | 707/9 |
| 2005/0147240 A1* | 7/2005 | Agrawal et al. ............. | 380/28 |
| 2005/0169374 A1* | 8/2005 | Marpe et al. ............ | 375/240.16 |

OTHER PUBLICATIONS

Kristen Lefevre, David J.DeWitt, Raghu Ramakrishnan, Mondrian Multidimensisonal K-Anonymity, Apr. 2006, pp. 1-11.*
Wang, Fung and Philip, Template-based privacy preservation in classification problems, 2005, IEEE.*
Charu C. Aggarwal and Philip S. Yu, A Condensation Approach to Privacy Preserving Data Mining, EDBT Conference, 2004.
Rakesh Agrawal and Ramakrishnan Srikant, Privacy-Preserving Data Mining. Proceedings of the ACM SIGMOD Conference, 2000.
Pierangela Samarati and Latanya Sweeney, Protecting Privacy when Disclosing Information: k-Anonymity and its Enforcement Through Generalization and Suppression, Proceedings of the IEEE Symposium on Research in Security and Privacy, May 1998.

* cited by examiner

*Primary Examiner* — Charles Kim
*Assistant Examiner* — Fatima P Mina
(74) *Attorney, Agent, or Firm* — Ference & Associates LLC

(57) ABSTRACT

Novel methods and systems for the privacy preserving mining of string data with the use of simple template based models. Such template based models are effective in practice, and preserve important statistical characteristics of the strings such as intra-record distances. Discussed herein is the condensation model for anonymization of string data. Summary statistics are created for groups of strings, and use these statistics are used to generate pseudo-strings. It will be seen that the aggregate behavior of a new set of strings maintains key characteristics such as composition, the order of the intra-string distances, and the accuracy of data mining algorithms such as classification. The preservation of intra-string distances is a key goal in many string and biological applications which are deeply dependent upon the computation of such distances, while it can be shown that the accuracy of applications such as classification are not affected by the anonymization process.

23 Claims, 6 Drawing Sheets

SYSTEMS AND METHODS FOR CONDENSATION-BASED PRIVACY IN STRINGS

This invention was made with government support under Contract No.: H98230-04-3-001 awarded by the U.S. Department of Defense. The Government has certain rights in this invention.

FIELD OF THE INVENTION

The present invention relates to data-mining methods and systems, and particularly to privacy-preserving data-mining methods and systems.

BACKGROUND OF THE INVENTION

Herebelow, designations presented in square brackets—[ ]—are keyed to the list of references found towards the close of the present disclosure.

"Privacy preserving" data mining has arisen as an important challenge in recent years because of the large amount of personal data available among corporations and individuals. An important method that has been developed for privacy preserving data mining is that of k-anonymity [samarati]. The k-anonymity approach has been extensively explored in recent years because of its intuitive significance in defining the level of privacy. A primary motivation behind the k-anonymity approach is that public databases can often be used by individuals to identify personal information about users. For example, a person's age and zip code can be used for identification to a very high degree of accuracy. Therefore, the k-anonymity method attempts to reduce the granularity of representation of the data in order to minimize the risk of disclosure.

To achieve such a goal, methods of generalization and suppression are employed. In the method of generalization, the multi-dimensional values are generalized to a range. In addition, some attributes or records may need to be suppressed in order to maintain k-anonymity. At the end of the process, the data is transformed in such a way that a given record cannot be distinguished from at least (k−1) other records in the data. In such cases, the data is said to be k-anonymous, since it is not possible to map a given record to less than k-individuals in the public database. The concept of k-anonymity has been intuitively appealing because of its natural interpretability in terms of the degree of privacy.

At the same time, a "condensation-based" technique [edbt04] has been proposed as an alternative to k-anonymity methods. A key difference between condensation and k-anonymity methods is that the former works with pseudo-data rather than with original records. Because of the use of pseudo-data, the identities of the records are even more secure from inference attacks; the idea is to utilize statistical summarization, which is then leveraged in order to create pseudo-data. As such, the condensation approach includes the following steps:

- Condensed groups of records are constructed. The number of records in each group is (at least) equal to the anonymity level k.
- The statistical information in the condensed groups can be utilized to synthetically generate pseudo-data which reflects the overall behavior of the original data.
- The condensed pseudo-groups can be utilized directly with minor modifications of existing data mining algorithms.

Typically, such pseudo-data is useful in aggregation-based data mining algorithms which utilize the aggregate trends and patterns in the data rather than individual records.

The condensation approach is very similar to the k-anonymity model since it guarantees that at least k records in the data cannot be distinguished from one another. At the same, since a one to one matching does not exist between the original and condensed data, it is more resistant to inference attacks. It is noted that the new data set need not even contain the same number of records as the original data set, as long as the records in different condensed groups are proportionately represented in the pseudo-data.

It has further been noted that k-anonymity methods have been developed for the case of multi-dimensional data, and do not work for the case of strings. The string domain is particularly important because of its applicability to a number of crucial problems for privacy preserving data mining in the biological domain. Recent research has shown that the information about diseases in medical data can be used in order to make inferences about the identity of DNA fragments. Many diseases of a genetic nature show up as specific patterns in the DNA of the individual. A possible solution is to anonymize the medical records, but this can at best provide a partial solution. This is because the information about DNA segments can be obtained from a variety of sources other than medical records. For example, identifying information can be obtained from a number of defining characteristics which are public information about the individual. Similarly, if DNA string fragments from a relative of a target are available, it can be used to identify the target. In general, it can be assumed that partial or complete information about the individual fragments of the strings is available. It may also be possible to have strings which are structurally related to the base strings in a specific way. Therefore, it is recognized as important to anonymize the strings in such a way that it is no longer possible to use these individual fragments in order to make inferences about the identities of the original strings.

In view of the foregoing, needs have been recognized in connection with improving upon the shortcomings and disadvantages of conventional efforts.

SUMMARY OF THE INVENTION

Broadly contemplated herein, in accordance with at least one presently preferred embodiment of the present invention, are new methods and systems for the privacy preserving mining of string data with the use of simple template based models. Such template based models are effective in practice, and preserve important statistical characteristics of the strings such as intra-record distances.

Discussed herein is the condensation model for anonymization of string data. Summary statistics are created for groups of strings, and use these statistics are used to generate pseudo-strings. The summary statistics contain first and second order information about the distribution of the symbols in the strings. The distribution contains sufficient probabilistic parameters in order to generate pseudo-strings which are similar to the original strings. It will be seen that the aggregate behavior of the new set of strings maintains key characteristics such as composition, the order of the intra-string distances, and the accuracy of data mining algorithms such as classification. It can be concluded that the preservation of intra-string distances is a key goal in many string and biological applications which are deeply dependent upon the computation of such distances. In addition, it can be shown that the accuracy of applications such as classification are not affected by the anonymization process.

In summary, one aspect of the invention provides a method of providing privacy preservation in data mining, the method comprising the steps of: accepting input at least in the form of data from a database; constructing groups of strings based on the accepted input data; the constructing step comprising employing at least one template; and creating pseudo-data based on the at least one template.

Another aspect of the invention provides a system of providing privacy preservation in data mining, the system comprising: an input module which accepts input at least in the form of data from a database; a construction module which constructs groups of strings based on the accepted input data; the construction module acting to employ at least one template and create pseudo-data based on the at least one template.

Furthermore, an additional aspect of the invention provides a program storage device readable by machine, tangibly embodying a program of instructions executable by the machine to perform method steps for providing privacy preservation in data mining, the method comprising the steps of: accepting input at least in the form of data from a database; constructing groups of strings based on the accepted input data; the constructing step comprising employing at least one template; and creating pseudo-data based on the at least one template.

DESCRIPTION OF THE PREFERRED EMBODIMENTS

Figure 1:
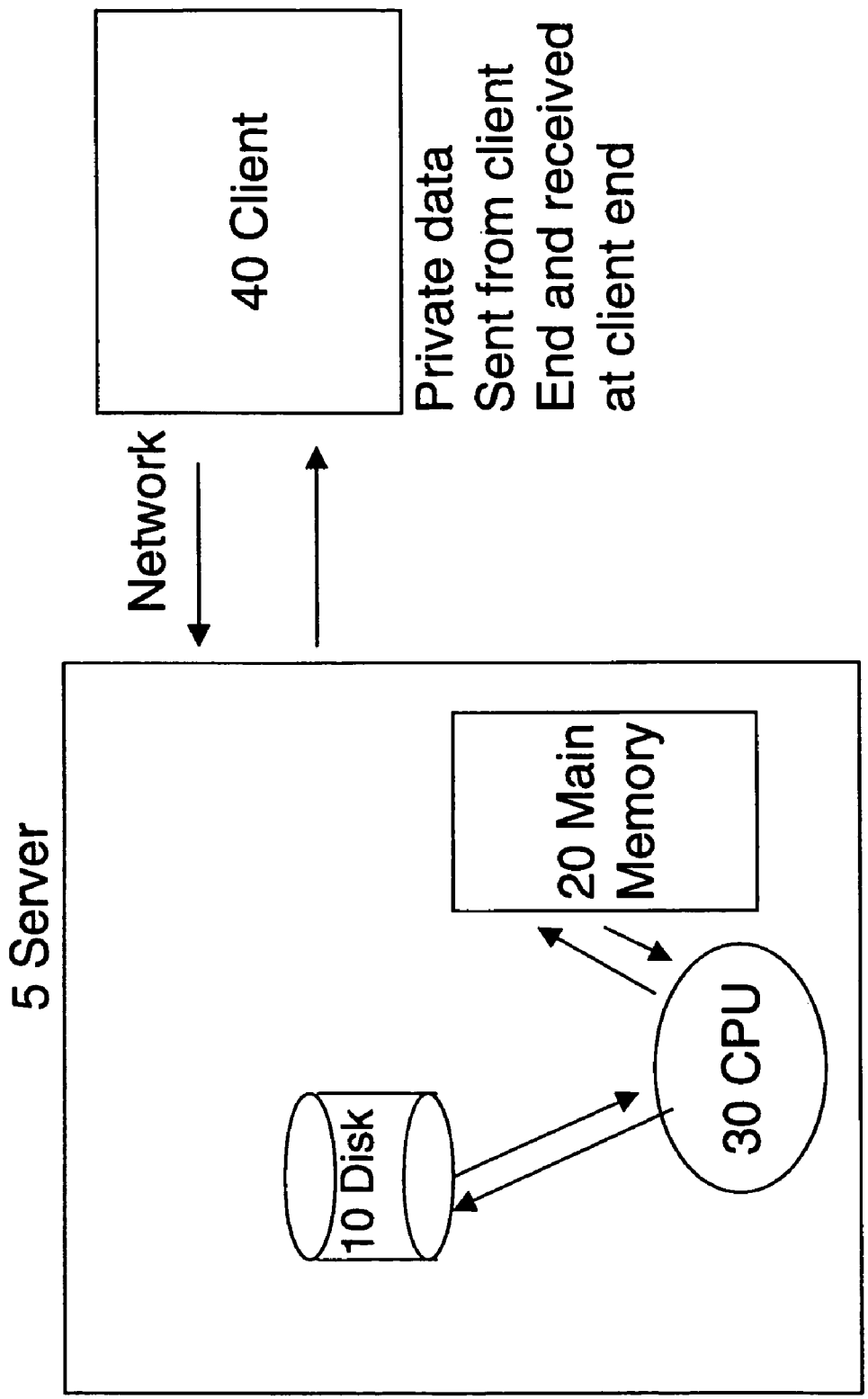
FIG. 1 schematically illustrates a system architecture.

For a better understanding of the present invention, together with other and further features and advantages thereof, reference is made to the following description, taken in conjunction with the accompanying drawings, and the scope of the invention will be pointed out in the appended claims.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 6, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Contemplated and discussed herein is the condensation model for string data. Let it be assumed that a database D contains N strings, and that an objective is to create a new anonymized database which satisfies the conditions of k-indistinguishability. The N strings are denoted by $S\_1 \ldots S\_N$. The condensation is preferably performed in such a way that it is no longer possible to use information about portions or fragments of the strings in order to identify the entire string.

In order to perform the privacy preserving transformation of the strings, a database is preferably provided in which the lengths of the strings are not too different from one another. In cases in which the database does contain strings of widely varying lengths, it is desirable to have a situation in which the lengths of strings are tightly distributed within certain ranges.

In order to formalize this definition, some tightness parameters may be defined. Specifically, the (epsilon, k)-similarity assumption is preferably defined for a database in terms of user defined parameter epsilon>0 and anonymity level k. This definition may be formalized as follows:

A set of strings D={S_1 ... S_N} is said to satisfy the (epsilon, k)-similar assumption, if a set of ranges [l_i, u_i] ... [l_r, u_r] can be found such that the following properties are satisfied:

u_i<=(1+epsilon)·l_i

For each i in {1...r} the range [l_i, u_i] contains at least k strings from the database D.

All strings from D belong to at least one of the ranges [l_i, u_i] for i in {1...r}.

In the event that the database does not satisfy this assumption, some of the strings may need to be suppressed in order to preserve k-anonymity. It is noted that a large enough value of epsilon can always be found for which the strings in the database can be made to satisfy the (epsilon, k)-similarity assumption. However, larger choices of epsilon are not desirable since this allows the lengths of strings in the database to vary in length. It will be seen that this complicates the process of generating pseudo-strings from these unevenly distributed strings.

In the event that the database does not satisfy the (epsilon, k)-similarity assumption, a preprocessing step is preferably performed in order to segment the database into different groups of strings. Each of these groups is homogeneous in length to a level chosen by the user-defined parameter epsilon. In addition, there is preferably a removal of those strings whose lengths are significantly different from the rest of the data. This happens when it is determined that these strings cannot easily be fit in any segment without violating the k-anonymity assumption. Once the database is segmented, one can apply the condensation procedure separately to each of these segments.

The preprocessing step works using a simple iterative approach in which one starts from the string having the smallest length l_s, and try to find all strings which lie in the range [l_s, (1+epsilon)·l_s]. If at least k strings can be found within this range, there is preferably created a new homogenized segment containing all strings whose lengths lie in the range [l_s, (1+\epsilon)·l_s]. This set of strings is removed from the database, and the process proceeds further.

On the other hand, when the range contains fewer than k strings, then one preferably excludes (i.e. suppresses) the smallest string from the database and proceeds further with the next smallest string. Thus, in each iteration, either a string is discarded from the database or a set of k strings is grouped together in one range and removed from the database. The procedure will terminate in at most N iterations, though the number of iteration is closer to N/k in practice. This is because a suppression operation should occur only in a small number of iterations, when a judicious choice of parameters is used. At the end of the process, there is a new set of database segments denoted by D_1 ... D_r in each of which the lengths are approximately equal (i.e., "approximately equal" owing to the fact that the lengths lie within a factor of [1+epsilon] of one another).

This preprocessing portion of the algorithm will be "abstracted out" herein; in other words, it will be assumed, without loss of generality, that the database D contains only strings which are within a factor of (1+epsilon) in terms of length. This can be done without loss of generality since it can be assumed that the subsequent steps are applied to each homogenized segment in the data. A homogenized segment of the database is converted into a set of templates.

Let it be assumed that the strings are drawn from the alphabet Sigma={sigma_1 ... sigma_l of size l. Each string is a sequence of symbols which are drawn from the alphabet Sigma. The process of string condensation requires the generation of pseudo-strings from groups of similar strings. In order to achieve this goal, there are first preferably created groups of k similar strings from which the condensed templates are formed. The statistics from each group of k similar strings is used to generate pseudo-strings. As discussed earlier, it can be assumed that the process of statistical condensation is applied to each homogeneous segment.

As discussed earlier, the preprocessing phase ensures that the lengths of all the different strings lie within a factor of at most epsilon. Let it be assumed that the N strings in the database are denoted by S_1 ... S_N, with corresponding lengths L_1 ... L_k. Then, the length of the template representation of this set of strings is equal to L=[sum_{j=1}^k L_j/N].

A first step is to convert each string into a probabilistic template representation of length L. This is done in order to facilitate further probabilistic analysis of the different positions on the strings. The probabilistic template is computed by calculating the probability of each symbol in the template of length L.

The summary statistics for the group G={T_1 \ldots T_k} can be defined as follows:

For each group G, the second order statistics are defined as the conditional probability of the occurrence of a symbol at the next position, given the symbol at the current position.

For each group G, the first order statistics Fs(G) are defined in terms of the absolute probability of the occurrence of each symbol.

For each group, the number of strings n(G)=k is maintained.

It is noted that the summary statistics turn out to be useful in generating the pseudo-data for the different groups which are created. The groups are constructed using a partitioning approach in which we use the probabilistic distance to construct the different groups. Any modification of a clustering algorithm can be used in order to construct the different groups. The aggregate statistics from these groups are used in order to generate the pseudo-strings.

Preferably, by way of starting a process of generating pseudo-strings, the first position is generated using the statistics Fs_{1p} for the different symbols. Specifically the p-th symbol is generated for the first position with probability Fs_{1p}({\cal G})/n({\cal G}).

Once the i-th position has been generated, the second order correlations are preferably used in order to generate the (i+1)-th position. The conditional probability of (i+1)-th position taking on a particular symbol value can be calculated using the first and second order statistics. Let it be assumed that the symbol at the i-th position is sigma p. Then, the conditional probability of the (i+1)-th position taking on the symbol sigma_q is defined by the expression Sc_{ipq}(G)/Fs_{ip}(G). This conditional probability is used in order to generate the symbol at the (i+1)th position from the symbol at the i-th position. This is done by flipping a biased die (as understood in mathematical probability theory) for that position, using the conditional probabilities to decide the weights on different sides. This step is iteratively repeated over the entire length of the pseudo-string.

Turning to a detailed description of embodiments of the present invention with reference to the accompanying drawings, in FIG. 1 there is illustrated an architecture which may preferably be employed. It is assumed that the private data reside at a client end (40), where it is processed and subsequently forwarded to the server (5). The server contains CPU (30), disk (10) and main memory (20). The private data is stored at the disk and is processed by the CPU (30) in order to create the pseudo-data. This pseudo-data is subsequently forwarded back to the client.

Figure 2:
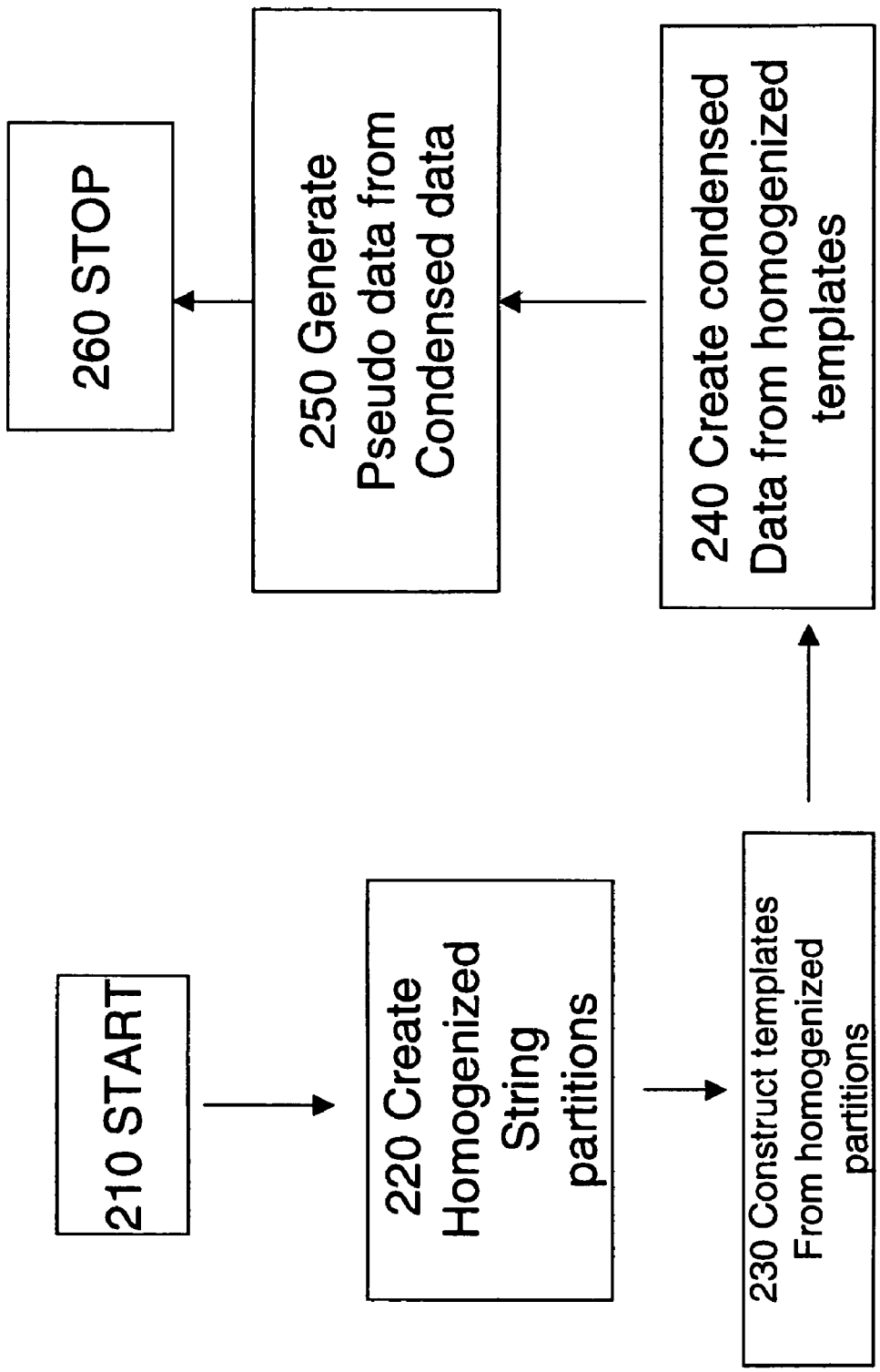
FIG. 2 schematically illustrates an overall approach for a privacy preserving data mining algorithm.

An overall process for creating the pseudo-data is illustrated in FIG. 2. In step 220, homogenized string partitions are created. These homogenized string partitions are such that the approximate lengths of the strings in each partition are very similar; this step will also be discussed in more detail with respect to FIG. 3. In step 230, templates are constructed from the homogenized string partitions; this step will be discussed in better detail with respect to FIG. 4. The templates are used in order to construct the condensed data for the strings (240); this step is discussed in better detail with respect to FIG. 5. Finally, the pseudo-data are constructed from the templates (250); this step is discussed below with regard to FIG. 6.

Figure 3:
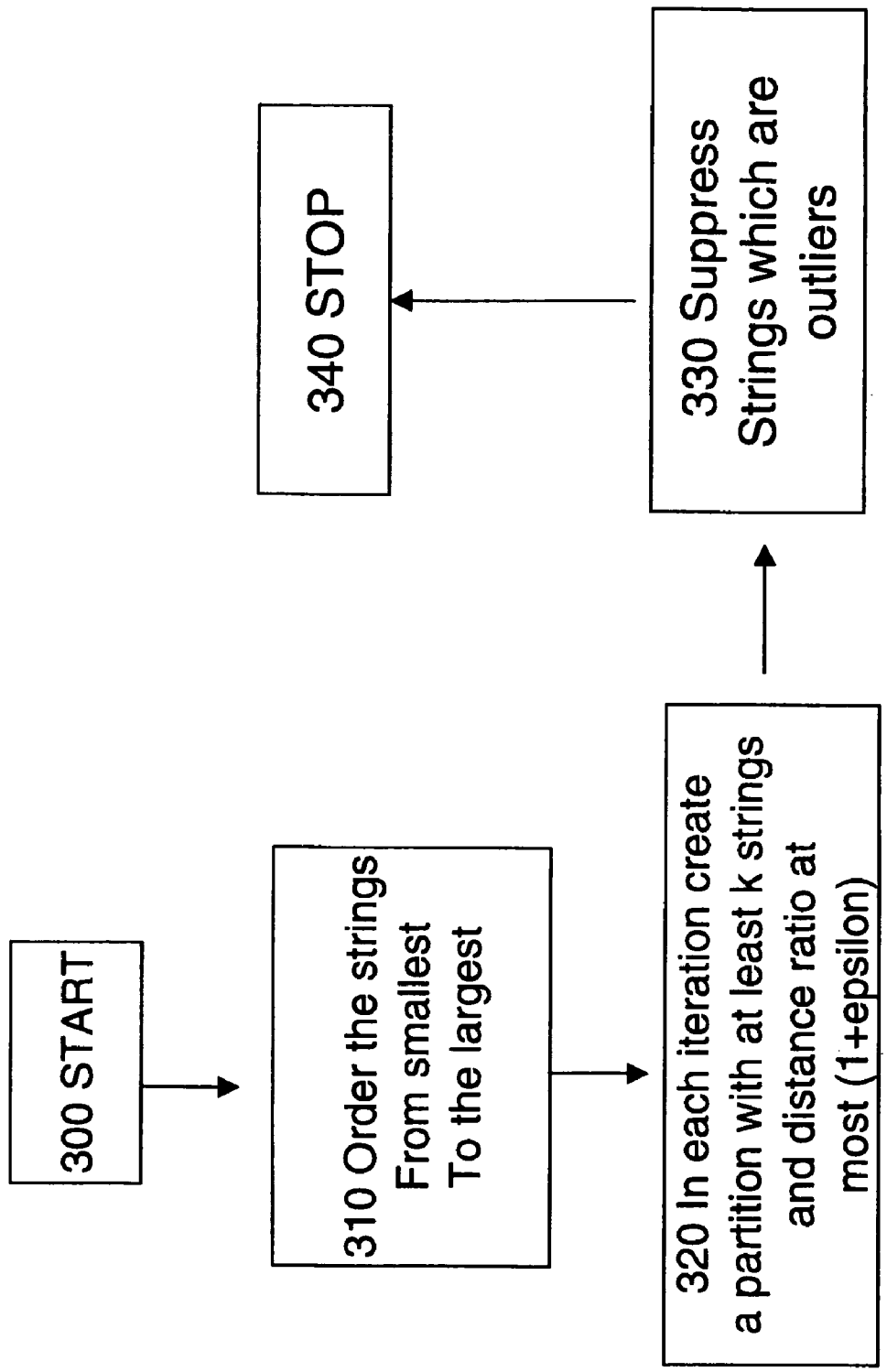
FIG. 3 schematically illustrates a homogenization process (step 220 of FIG. 2).

The process of homogenization is depicted in FIG. 3 (which can also be considered a detailed depiction of step 220 of FIG. 2). In order to perform the homogenization process, the strings are ordered from smallest to largest (step 310) and then partitions are created such that each partition contains at least k strings. Each such partition also has the property that the largest string lies within a ratio of (1+epsilon) of the smallest string. This is done in step 320. Another property of the homogenization process is that some partitions may not contain k strings because of the length constraint. As a result such partitions are considered outlier strings, and are suppressed. The suppression of the outlier strings is performed in step 330.

Figure 4:
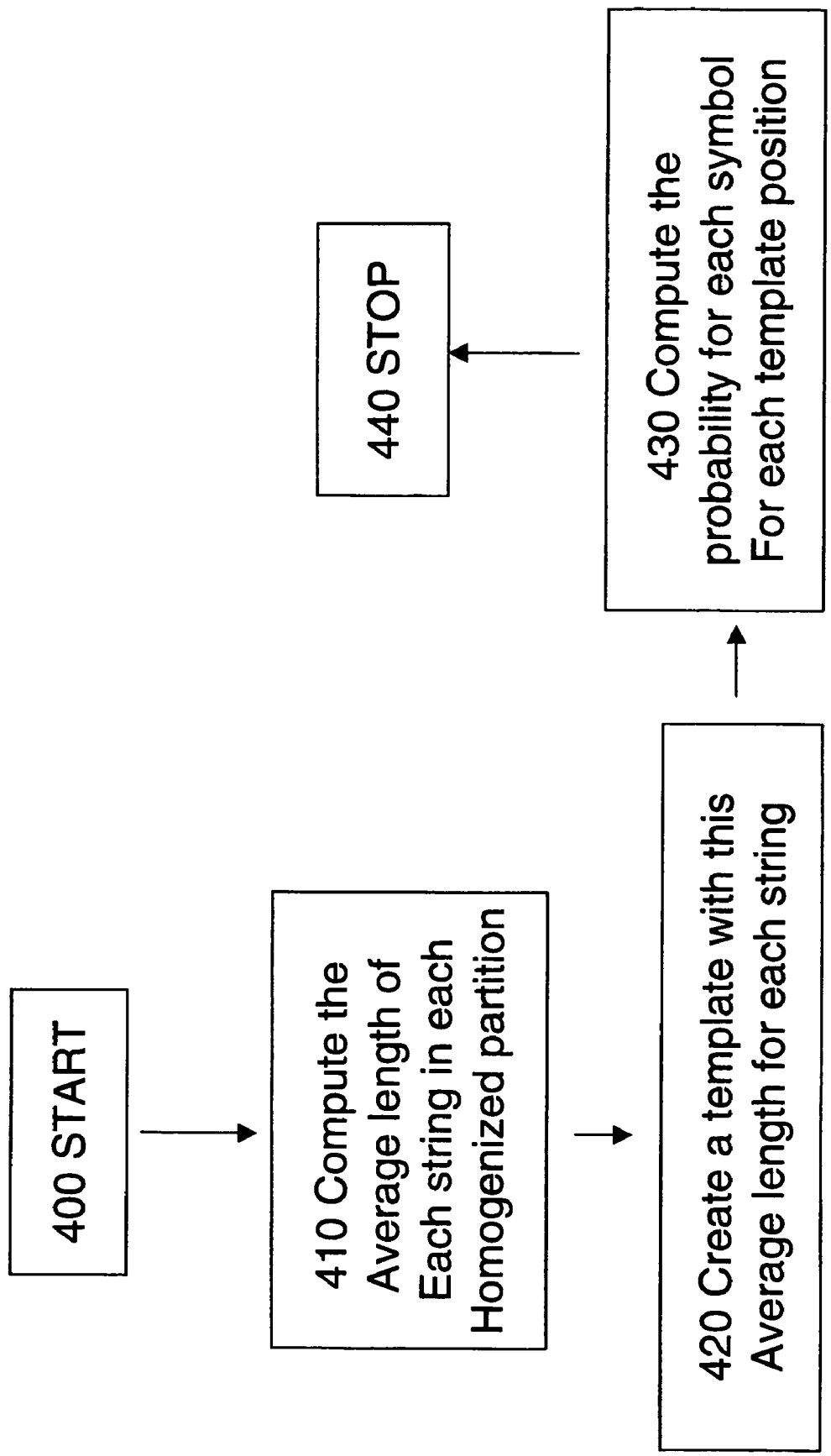
FIG. 4 schematically illustrates a the template construction process (step 230 of FIG. 2).

FIG. 4 is a depiction of the construction of the templates for each string, and can also be considered a detailed depiction of step 230 of FIG. 2. The first step is to compute the average length of each string in each homogenized partition. This is done in step 410. In step 420, there is created a template having this average length for each string. Then, the probability of occurrence of the different symbols is computed using extrapolation from the original string. Specifically, the relative frequency of the different symbols in the closest positions is used for this purpose. This is achieved in step 430. The final set of templates are easier to cluster since they are all of the same length, and this eases the process of performing distance calculations.

Figure 5:
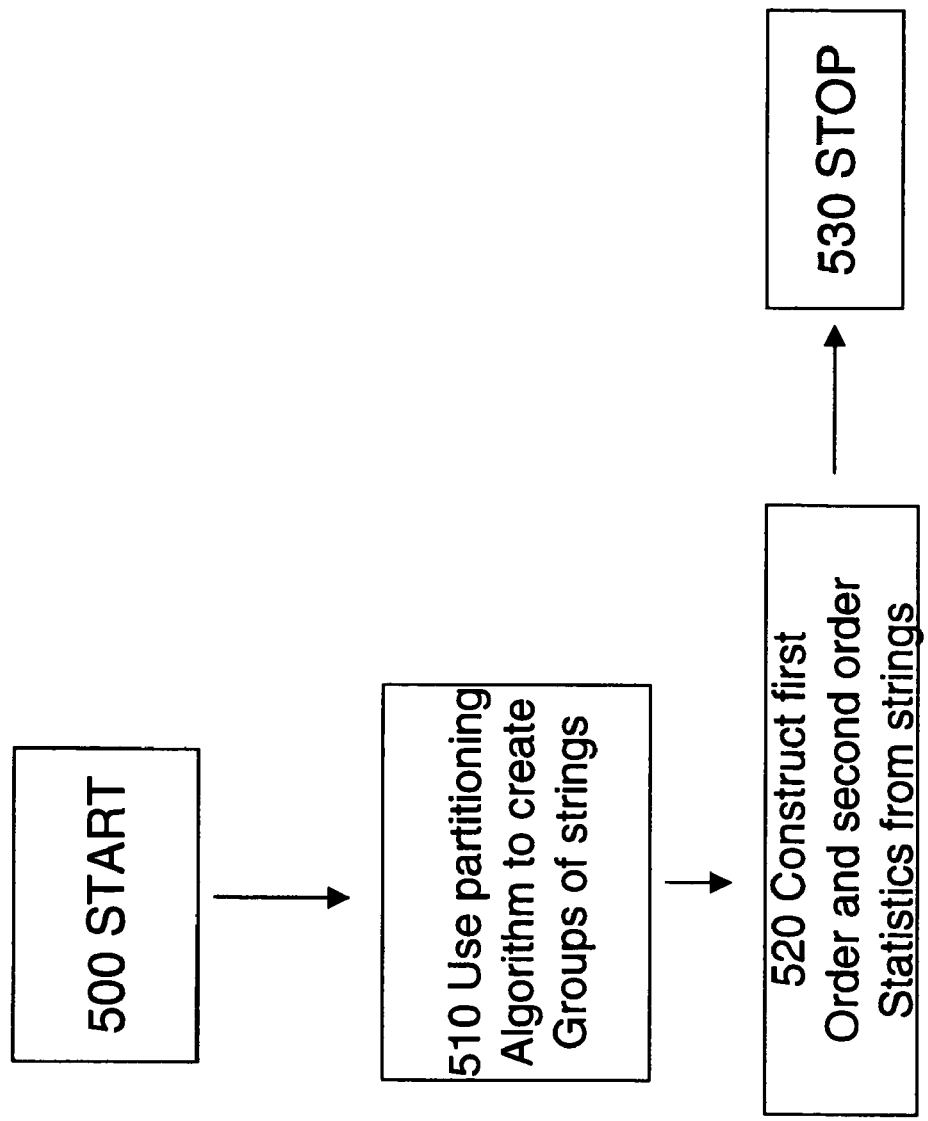
FIG. 5 schematically illustrates partitioning and condensation based data storage (step 240 of FIG. 2).

FIG. 5 is a depiction of the process of constructing the condensed group statistics from the templates; this can also be considered a detailed depiction of step 240 of FIG. 2. The first step is to create a second level of partitioning from each homogenized database. However, there is the additional constraint that each partition should contain at least k strings. There are many known clustering algorithms; for the present illustrative purpose, a simple partitioning approach may be used in which a set of samples is picked and the closest strings to the different samples are assigned. In order to satisfy the key constraint that each partition should contain at least k strings, partitions are removed which have less than k strings, while their strings are reassigned to other partitions. This is achieved in step 510. Once the partitions have been constructed, there are preferably calculated the first order and second order statistics from each group. As discussed earlier, the first order statistics include the relative probability of each position at a given position. The second order statistics include the conditional probability of occurrence of a given symbol given another symbol at a particular position. This step is denoted by block 520 in FIG. 5.

Figure 6:
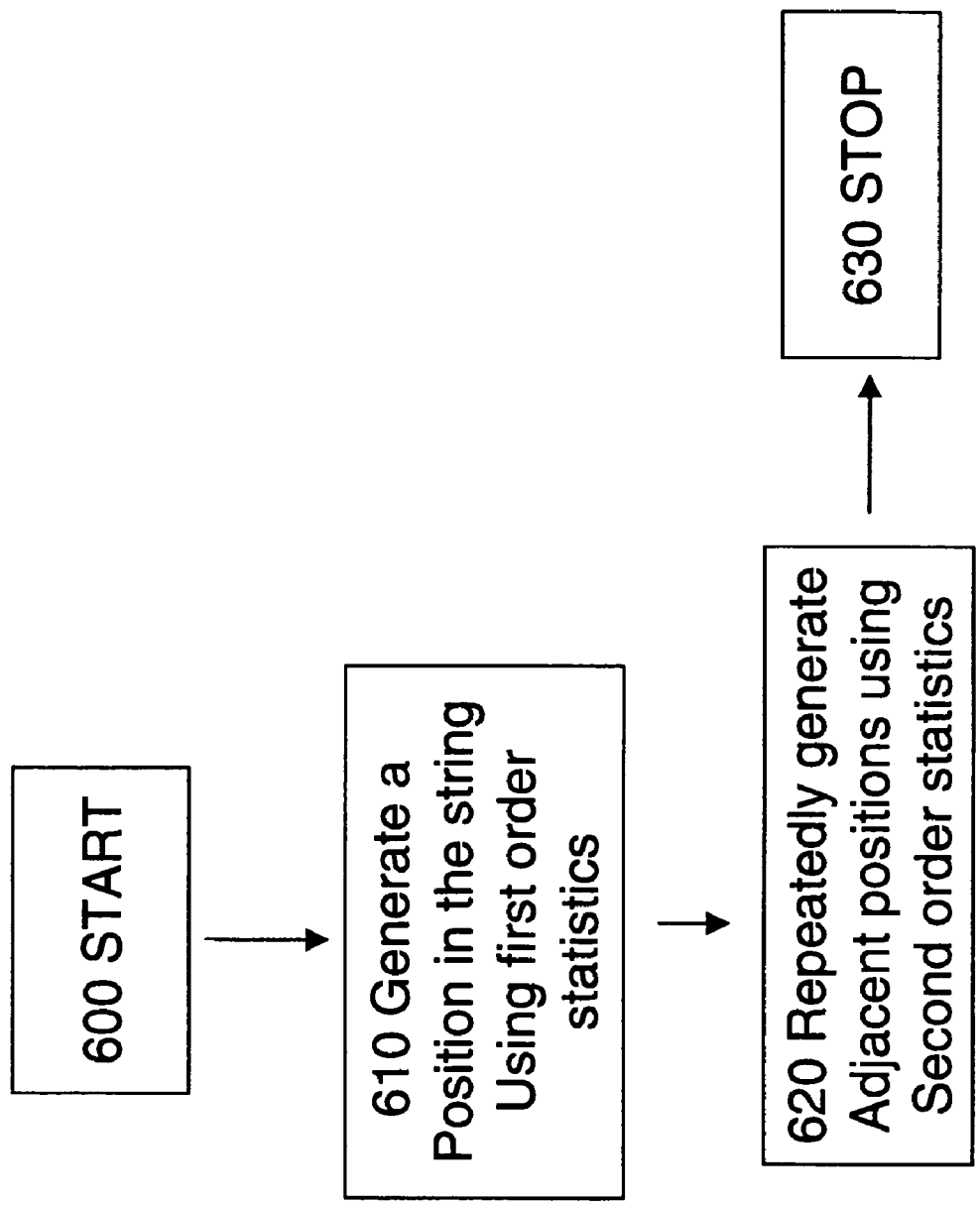
FIG. 6 schematically illustrates pseudo-data generation from condensed data (step 250 of FIG. 2).

FIG. 6 illustrates how to generate the pseudo-data from the condensed data generated in FIG. 5; FIG. 6 can also be considered a detailed depiction of step 250 of FIG. 2. In step 610, a position in the string is generated using the first order statistics. This is relatively simple, since the first order statistics contains the relative probability of the symbols at a particular position. Once a given position has been generated, one can leverage on it to construct the other positions in the string. This is done by using the conditional probability in the second order statistics. Each adjacent position is iteratively generated using this conditional probability. This is done in step 620, and completes the generation of each pseudo-string. The final set of pseudo-strings thus generated can be used for data mining purposes, since they typically retain their statistical behavior over the data set.

In brief recapitulation, there is proposed herein methods for the condensation based privacy preserving of data mining of strings. Presented are methods for segmenting the string data into groups. The segmented string data is then used in order to generate pseudo-data from the different strings. This generation is done by constructing a probabilistic model from each group. The probabilistic model stores both first and second order information about the string templates in each group, and uses these summary statistics to generate strings which fit this model.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

REFERENCES

[edbt04] Aggarwal C. C., Yu P. S. A Condensation Based Approach to Privacy Preserving Data Mining. EDBT Conference, 2004.

[agrawal] Agrawal R., Srikant R. Privacy Preserving Data Mining. Proceedings of the ACM SIGMOD Conference, 2000.

[samarati] Samarati P., Sweeney L: Protecting Privacy when Disclosing Information: k-Anonymity and its Enforcement Through Generalization and Suppression. Proceedings of the IEEE Symposium on Research in Security and Privacy, May 1998.

What is claimed is:

1. A method comprising:
utilizing one or more processors to execute one or more modules of executable code, the one or more modules of executable code being configured for:

accepting input at least in the form of input string data comprising one or more strings from a database, each of the one or more strings comprising one or more symbols;

constructing one or more pseudo-strings based on the input string data;

said constructing step comprising:

converting each of the one or more strings into at least one template, the at least one template comprising at least one probabilistic template; and creating the one or more pseudo-strings based on the at least one template;

storing a relative probability of the one or more symbols a given position from each group in said input string data; and storing a conditional probability of the one or more symbols for adjacent positions in said input string data;

wherein said step of creating the one or more pseudo-strings comprises:

employing the stored relative and conditional probabilities;

employing a relative probability to generate a first position in at least one of the one or more pseudo-strings; and employing at least one conditional probability to iteratively generate adjacent, positions in at least one of the one or more pseudo-strings;

wherein the first position and the adjacent positions preserve one or more characteristics of the input string data, the one or more characteristics including one or more of composition and an order of intra-string distances;

wherein the one or more pseudo-strings preserve important characteristics of the input string data while providing privacy preservation of the input string data.

2. The method according to claim 1, wherein:

said step of accepting input further comprises accepting as input a parameter k towards affording k-anonymization of the accepted input string data.

3. The method according to claim 2, wherein said constructing step comprises constructing groups of k-strings towards affording k-anonymization of the input string data.

4. The method according to claim 1, wherein said constructing step comprises homogenizing the input string data.

5. The method according to claim 4, wherein said homogenizing step comprises establishing partitions in the input string data such that lengths of the one or more strings included in the input string data and defined by the partitions lie within a predetermined ratio of one another.

6. The method according to claim 5, wherein said step of establishing partitions comprises employing a greedy algorithm.

7. The method according to claim 4, wherein said homogenizing step further comprises suppressing outlier strings.

8. The method according to claim 1, wherein generating the at least one probabilistic template comprises calculating a probability of the one or more symbols within said input string data.

9. The method according to claim 1, wherein said constructing step further comprises homogenizing and segmenting the input string data.

10. The method according to claim 9, wherein said constructing step further comprises creating the at least one probabilistic template from each data segment.

11. The method according to claim 1, wherein said step of converting each of the one or more strings into at least one template comprises partitioning templates into groups via a partitioning algorithm.

12. A system comprising:

one or more processors configured to execute one or more modules, the one or more modules comprising:

an input module which accepts input at least in the form of input string data comprising one or more strings from a database, each of the one or more strings comprising one or more symbols;

a construction module which constructs one or more pseudo-strings based on the input string data;

said construction module acting to:

convert each of the one or more strings into at least one template, the at least one template comprising at least one probabilistic template; and create the one or more pseudo-strings based on the at least one template;

store a relative probability of the one or more symbols a given position from each group in said input string data; and store a conditional probability of the one or more symbols for adjacent positions in said input string data;

wherein said step of creating the one or more pseudo-strings comprises:

creating the one or more pseudo-strings via employing the stored relative and conditional probabilities;

employing a relative probability to generate a first position in at least one of the one or more pseudo-strings; and employing at least one conditional probability to iteratively generate adjacent positions in at least one of the one or more pseudo-strings;

wherein the first position and adjacent positions preserve one or more characteristics of the input string data, the one or more characteristics including one or more of composition and an order of intra-string distances;

wherein the one or more pseudo-strings preserve important characteristics of the input string data while providing privacy preservation of the input string data.

13. The system according to claim 12, wherein said input module acts to accept as input a parameter k towards affording k-anonymization of the input string data.

14. The system according to claim 13, wherein said construction module acts to construct groups of k-strings towards affording k-anonymization of the input string data.

15. The system according to claim 12, wherein said construction module acts to homogenize the input string data.

16. The system according to claim 15, wherein said construction module further acts to establish partitions in the input string data such that lengths of the one or more strings included in the input string data and defined by the partitions lie within a predetermined ratio of one another.

17. The system according to claim 16, wherein said construction module acts to employ a greedy algorithm in establishing partitions.

18. The system according to claim 15, wherein said construction module further acts to suppress outlier strings.

19. The system according to claim 12, wherein the construction module acts to generate the at least one template by calculating a probability of the one or more symbols within said input string data.

20. The system according to claim 12, wherein said construction module further acts to homogenize and segment the input string data.

21. The system according to claim 20, wherein said construction module further acts to create the at least one probabilistic template from each data segment.

22. The system according to claim 12, wherein said construction module acts to partition templates into groups via a partitioning algorithm.

23. A program storage device readable by machine, tangibly embodying a program of instructions executable by the machine to perform method steps for providing privacy preservation in data mining, said method comprising the steps of:
- accepting input at least in the form of input string data comprising one or more strings from a database, each of the one or more strings comprising one or more symbols;
- constructing one or more pseudo-strings based on the input string data;
- said constructing step comprising:
  - converting each of the one or more strings into at least one template, the at least one template comprising at least one probabilistic template;
  - creating the one or more pseudo-strings based on the at least one template;
  - storing a relative probability of the one or more symbols a given position from each group in said input string data; and
  - storing a conditional probability of the one or more symbols for adjacent positions in said input string data;
- wherein said step of creating the one or more pseudo-strings comprises:
  - employing the stored relative and conditional probabilities;
  - employing a relative probability to generate a first position in at least one of the one or more pseudo-strings; and
  - employing at least one conditional probability to iteratively generate adjacent, positions in at least one of the one or more pseudo-strings;
  - wherein the first position and the adjacent positions preserve one or more characteristics of the input string data, the one or more characteristics including one or more of composition and an order of intra-string distances;
- wherein the one or more pseudo-strings preserve characteristics of the input string data while providing privacy preservation of the input string data.

* * * * *